US011200059B2

(12) United States Patent
Hanaki et al.

(10) Patent No.: US 11,200,059 B2
(45) Date of Patent: *Dec. 14, 2021

(54) PROCESSOR WITH A PROGRAM COUNTER INCREMENT BASED ON DECODING OF PREDECODE BITS

(71) Applicant: SONY CORPORATION, Tokyo (JP)

(72) Inventors: Hirokazu Hanaki, Kanagawa (JP); Satoshi Takashima, Tokyo (JP)

(73) Assignee: SONY CORPORATION, Tokyo (JP)

(*) Notice: Subject to any disclaimer, the term of this patent is extended or adjusted under 35 U.S.C. 154(b) by 246 days.

This patent is subject to a terminal disclaimer.

(21) Appl. No.: 15/612,247

(22) Filed: Jun. 2, 2017

(65) Prior Publication Data

US 2017/0277540 A1    Sep. 28, 2017

Related U.S. Application Data

(63) Continuation of application No. 13/137,134, filed on Jul. 22, 2011, now Pat. No. 9,841,978.

(30) Foreign Application Priority Data

Sep. 13, 2010    (JP) .............................. JP2010-203910

(51) Int. Cl.
*G06F 9/32*    (2018.01)
*G06F 9/30*    (2018.01)
*G06F 9/38*    (2018.01)

(52) U.S. Cl.
CPC .......... *G06F 9/321* (2013.01); *G06F 9/30145* (2013.01); *G06F 9/382* (2013.01);
(Continued)

(58) Field of Classification Search
CPC .... G06F 9/30145; G06F 9/3877; G06F 9/321; G06F 9/382; G06F 9/3822
See application file for complete search history.

(56) References Cited

U.S. PATENT DOCUMENTS 5,623,621 A    4/1997    Garde
5,761,470 A    6/1998    Yoshida
(Continued)

FOREIGN PATENT DOCUMENTS

JP    03-129433 A    6/1991
JP    05-020067 A    1/1993
(Continued)

OTHER PUBLICATIONS

CPU cache, Dec. 31, 2008, Wikipedia, 19 pages, [retrieved from the internet on Dec. 18, 2014], retrieved from URL <http://en.wikipedia.org/w/index.php?title=CPU_cache&old id=261016797>.
(Continued)

*Primary Examiner* — Jyoti Mehta
(74) *Attorney, Agent, or Firm* — Chip Law Group

(57) ABSTRACT

A processor includes: an instruction fetch portion configured to fetch simultaneously a plurality of fixed-length instructions in accordance with a program counter; an instruction predecoder configured to predecode specific fields in a part of the plurality of fixed-length instructions; and a program counter management portion configured to control an increment of the program counter in accordance with a result of the predecoding.

5 Claims, 10 Drawing Sheets

(52) U.S. Cl.
CPC .......... *G06F 9/3822* (2013.01); *G06F 9/3877* (2013.01); *G06F 9/3885* (2013.01)

(56) References Cited

U.S. PATENT DOCUMENTS

| | | | |
|---|---|---|---|
| 6,023,757 | A | 2/2000 | Nishimoto et al. |
| 6,292,845 | B1 | 9/2001 | Fleck et al. |
| 6,650,317 | B1 * | 11/2003 | Boone .................. G06F 3/1407 341/26 |
| 6,925,548 | B2 | 8/2005 | Matsuo et al. |
| 7,343,475 | B2 | 3/2008 | Miyamori |
| 2002/0042871 | A1 | 4/2002 | Yoshida |
| 2002/0046372 | A1 | 4/2002 | Inagaki |
| 2002/0116596 | A1 | 8/2002 | Sanches et al. |
| 2002/0174327 | A1 | 11/2002 | Kruckemyer et al. |
| 2009/0106467 | A1 | 4/2009 | Kashiwagi et al. |

FOREIGN PATENT DOCUMENTS

| | | |
|---|---|---|
| JP | 06-161753 A | 6/1994 |
| JP | 07-121371 A | 5/1995 |
| JP | 09-212358 A | 8/1997 |
| JP | 2000-207202 A | 7/2000 |
| JP | 2001-034471 A | 2/2001 |
| JP | 2001-297002 A | 10/2001 |
| JP | 2002-032218 A | 1/2002 |
| JP | 2003-005958 A | 1/2003 |

OTHER PUBLICATIONS

Japanese Office Action for JP Patent Application No. 2010-203910, dated Mar. 11, 2014, 04 pages of English Translation.
Hennessy and Patterson, "Computer Architecture A Quantitative Approach", Morgan Kaufmann, 2nd edition, 1996, pp. 127-134.
Extended European Search for EP Patent Application No. 11175053, dated Feb. 6, 2012, 14 pages.
Non-Final Rejection for U.S. Appl. No. 13/137,134, dated Dec. 5, 2013, 18 pages.
Final Rejection for U.S. Appl. No. 13/137,134, dated Apr. 4, 2014, 18 pages.
Non-Final Rejection for U.S. Appl. No. 13/137,134, dated Jan. 7, 2015, 35 pages.
Final Rejection for U.S. Appl. No. 13/137,134, dated May 27, 2015, 23 pages.
Non-Final Rejection for U.S. Appl. No. 13/137,134, dated Mar. 24, 2016, 18 pages.
Final Rejection for U.S. Appl. No. 13/137,134, dated Jul. 12, 2016, 10 pages.
Notice of Allowance and Fees Due for U.S. Appl. No. 13/137,134, dated Mar. 8, 2017, 10 pages.
Advisory Action for U.S. Appl. No. 13/137,134, dated Sep. 22, 2016, 03 pages.
Advisory Action for U.S. Appl. No. 13/137,134, dated Aug. 10, 2015, 03 pages.
Advisory Action for U.S. Appl. No. 13/137,134, dated Jun. 20, 2014, 03 pages.
Mizuno, et al., "Design Methodology and System for a Configurable Media Embedded Processor Extensible to VLIW Architecture" IEEE International Conference on Computer Design; VLSI in Computers and Processors (ICCD'02), 2002, 06page.
Mizuno, et al., "Design Methodology and System for a Configurable Media Embedded Processor Extensible to VLIW Architecture" SIEEE International Conference on Computer Design; VLSI in Computers and Processors, Sep. 18, 2002, 06 pages.

* cited by examiner

F I G . 1
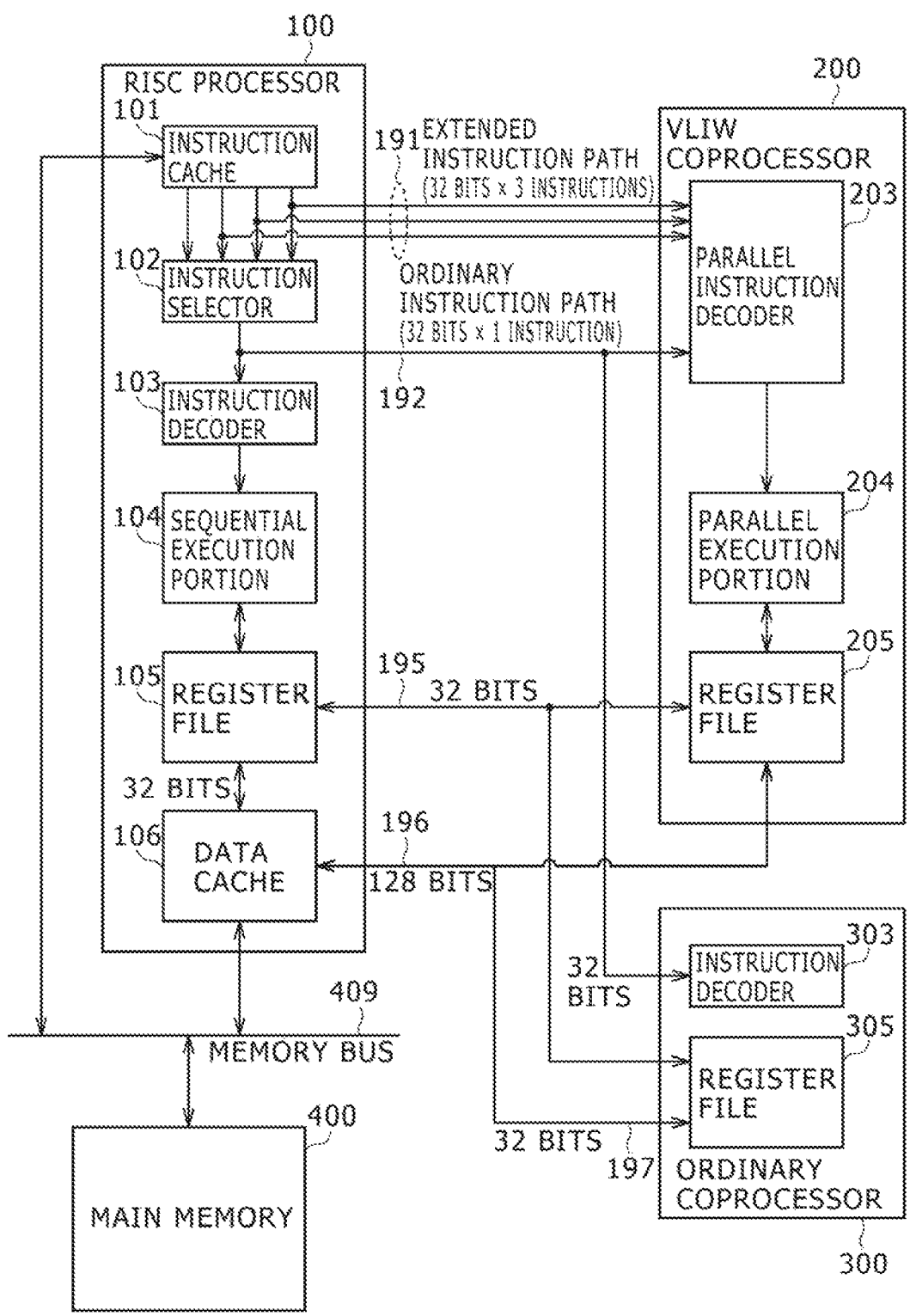

FIG.6

| | INSTRUCTION SLOT #0 | INSTRUCTION SLOT #1 | INSTRUCTION SLOT #2 | INSTRUCTION SLOT #3 |
|---|---|---|---|---|
| | LOW-ORDER 2 BITS OF PC = 0 | +1 | +2 | +3 |
| PATTERN 1 OF 4 SIMULTANEOUSLY ISSUED INSTRUCTIONS | VLIW COPROCESSOR INSTRUCTION | VLIW COPROCESSOR INSTRUCTION | VLIW COPROCESSOR INSTRUCTION | VLIW COPROCESSOR INSTRUCTION |
| PATTERN 2 OF 4 SIMULTANEOUSLY ISSUED INSTRUCTIONS | RISC INSTRUCTION | VLIW COPROCESSOR INSTRUCTION | VLIW COPROCESSOR INSTRUCTION | VLIW COPROCESSOR INSTRUCTION |
| PATTERN 3 OF 4 SIMULTANEOUSLY ISSUED INSTRUCTIONS | RISC-VLIW TRANSFER INSTRUCTION | VLIW COPROCESSOR INSTRUCTION | VLIW COPROCESSOR INSTRUCTION | VLIW COPROCESSOR INSTRUCTION |

FIG.7

| | LOW-ORDER 2 BITS OF PC = 0 | +1 | +2 | +3 |
|---|---|---|---|---|
| PATTERN 1 OF 2 SIMULTANEOUSLY ISSUED INSTRUCTIONS | VLIW COPROCESSOR INSTRUCTION | VLIW COPROCESSOR INSTRUCTION | (2 SIMULTANEOUSLY ISSUED INSTRUCTIONS) / (1 ISSUED INSTRUCTION) | (1 ISSUED INSTRUCTION) |
| PATTERN 2 OF 2 SIMULTANEOUSLY ISSUED INSTRUCTIONS | RISC INSTRUCTION | VLIW COPROCESSOR INSTRUCTION | (2 SIMULTANEOUSLY ISSUED INSTRUCTIONS) / (1 ISSUED INSTRUCTION) | (1 ISSUED INSTRUCTION) |
| PATTERN 3 OF 2 SIMULTANEOUSLY ISSUED INSTRUCTIONS | RISC-VLIW TRANSFER INSTRUCTION | VLIW COPROCESSOR INSTRUCTION | (2 SIMULTANEOUSLY ISSUED INSTRUCTIONS) / (1 ISSUED INSTRUCTION) | (1 ISSUED INSTRUCTION) |

FIG.8

| | LOW-ORDER 2 BITS OF PC = 0 | +1 | +2 | +3 |
|---|---|---|---|---|
| PATTERN 1 OF 1 ISSUED INSTRUCTION | VLIW COPROCESSOR INSTRUCTION | (1 ISSUED INSTRUCTION) | (2 SIMULTANEOUSLY ISSUED INSTRUCTIONS) / (1 ISSUED INSTRUCTION) | (1 ISSUED INSTRUCTION) |
| PATTERN 2 OF 1 ISSUED INSTRUCTION | RISC INSTRUCTION | (1 ISSUED INSTRUCTION) | (2 SIMULTANEOUSLY ISSUED INSTRUCTIONS) / (1 ISSUED INSTRUCTION) | (1 ISSUED INSTRUCTION) |
| PATTERN 3 OF 1 ISSUED INSTRUCTION | RISC-VLIW TRANSFER INSTRUCTION | (1 ISSUED INSTRUCTION) | (2 SIMULTANEOUSLY ISSUED INSTRUCTIONS) / (1 ISSUED INSTRUCTION) | (1 ISSUED INSTRUCTION) |

FIG.9

|  | INSTRUCTION SLOT #0 | INSTRUCTION SLOT #1 | INSTRUCTION SLOT #2 | INSTRUCTION SLOT #3 |
|---|---|---|---|---|
|  | 31　　　　0 | 31　　　　0 | 31　　　　0 | 31　　　　0 |
| 4 SIMULTANEOUSLY ISSUED INSTRUCTIONS |  | 4 |  | 4 |

FIG.10

|  | 31　　0 | 31　　0 | 31　　0 | 31　　0 |
|---|---|---|---|---|
| 2+2 ISSUED INSTRUCTION |  | 2 |  | 2 |

FIG.11

|  | 31　　0 | 31　　0 | 31　　0 | 31　　0 |
|---|---|---|---|---|
| 2+1+1 ISSUED INSTRUCTION |  | 2 |  | 1 |

FIG.12

|  | 31　　0 | 31　　0 | 31　　0 | 31　　0 |
|---|---|---|---|---|
| 1+1+2 ISSUED INSTRUCTION |  | 1 |  | 2 |

FIG.13

| SIMULTANEOUSLY ISSUABLE INSTRUCTION COUNT | | PROGRAM COUNTER INCREMENT VALUE |
|---|---|---|
| #1 | #3 | |
| 4 | 4 | +4 |
| 2 | 2 | +2 →+2 |
| 2 | 1 | +2 →+1→+1 |
| 1 | 2 | +1→+1→+2 |
| 1 | 1 | +1→+1→+1→+1 |

FIG. 14

| INLINE ASSEMBLER MACRO INSTRUCTIONS | DESCRIPTION |
|---|---|
| VliwAlign4 | INLINE ASSEMBLER MACRO (4-WORD ALIGNMENT) |
| VliwAlign2 | INLINE ASSEMBLER MACRO (2-WORD ALIGNMENT) |
| VliwQ4 | VLIW COPROCESSOR INSTRUCTION MACRO (4 INSTRUCTIONS SIMULTANEOUSLY) |
| VliwQ3 | VLIW COPROCESSOR INSTRUCTION MACRO (1+3 INSTRUCTIONS SIMULTANEOUSLY) |
| VliwD2 | VLIW COPROCESSOR INSTRUCTION MACRO (2 INSTRUCTIONS SIMULTANEOUSLY) |
| VliwD1 | VLIW COPROCESSOR INSTRUCTION MACRO (1+1 INSTRUCTIONS SIMULTANEOUSLY) |
| Vliw | VLIW COPROCESSOR INSTRUCTION MACRO (1 INSTRUCTIONS SIMULTANEOUSLY) |
| Vliw_LD,ST,MT,MF ETC. | RISC-VLIW COMMUNICATION INSTRUCTION |
| _addu_ ETC. | RISC INSTRUCTION |

FIG.15

| INLINE ASSEMBLER MACRO INSTRUCTIONS | SIMULTANEOUSLY ISSUABLE INSTRUCTION COUNT | | | |
|---|---|---|---|---|
| | #0 | #1 | #2 | #3 |
| VliwQ4 | 4 | | | |
| RISC INSTRUCTION +VliwQ3 | — | | | |
| VliwD2 | 2 | | (2 OR 1) | |
| RISC INSTRUCTION +VliwD1 | — | | | |
| Vliw | 1 | | | |

FIG. 16

```
include "VLIW.h"  //VARIOUS Inline ASSEMBLER MACRO DEFINITIONS void sample_code ()
{
         OMITTED for ( i=0; i<100; i++ ) {
 1:     Vliw_Align4;
 2:     __addsl_{ y, a, b };  Vliw_O2I( 0, Vliw_SUB, R13, R13, R13,  0, Vliw_ADD, R14, R14, R14,  0, Vliw_nop, R0, R0, R0 );
 3:     Vliw_O2I( 0, Vliw_ADD, R1, R1, R5,   0, Vliw_SUB, R5, R1, R5,   0, Vliw_nop, R0, R0, R0,   0, Vliw_nop, R0, R0, R0 );
 4:     Vliw_ST( p.data, 0, R6 );  Vliw_O2I( 0, Vliw_ADD, R8, R8, R11,  0, Vliw_SUB, R11, R9, R11,  0, Vliw_nop, R0, R0, R0 );
 5:     p.data_j += data_offset;
 6:     Vliw( 0, Vliw_MUL, M0, R13, R16);
 7:     Vliw( 0, Vliw_MAD, M0, R12, R16);
 8:     Vliw_Align2;
 9:     Vliw_O2I( 0, Vliw_VSRAMI, R13, M0, 15,  0, Vliw_MUL, M1, R10, R17);
10:     __addsl_{ z, c, d };  Vliw_O1( 0, Vliw_MUL, M1, R11, R17);
    }
}
```

PROCESSOR WITH A PROGRAM COUNTER INCREMENT BASED ON DECODING OF PREDECODE BITS

CROSS REFERENCE TO RELATED APPLICATIONS

The present application is a continuation application of U.S. patent application Ser. No. 13/137,134, filed Jul. 22, 2011, which claims the priority from prior Japanese Priority Patent Application JP 2010-203910 filed in the Japan Patent Office on Sep. 13, 2010. Each of the above-referenced applications is hereby incorporated herein by reference in its entirety.

BACKGROUND

The present disclosure relates to a processor. More particularly, the disclosure relates to a processor that presupposes the use of a VLIW (Very Long Instruction Word) type parallel execution portion or the like.

Sequential execution processors such as RISC (Reduced Instruction Set Computer) processors are suited for general-purpose control processes. Parallel execution processors such as VLIW processors, on the other hand, are good at performing simple and numerous parallel execution processes for specific purposes. Usually, these two types of processors each possess an independent instruction cache or RAM (Random Access Memory) and operate independently (issuing and executing instructions). That is, RISC-side processes and VLIW processor processes do not mix; they can exchange information solely on a shared memory at a higher layer. It is difficult to merge these two kinds of processes in minute increments.

In the past, there were proposed processors that use subroutine instruction codes of RISC processor instructions to operate a VLIW control unit (e.g., see Japanese Patent Laid-Open No. 2002-032218 (FIG. 1)). The proposed technique involves using subroutine instruction codes to designate program numbers causing the VLIW control unit to start program execution. This allows the VLIW control unit to carry out parallel execution.

SUMMARY

According to the proposed technique outlined above, RISC processor instructions may be used to start parallel execution of the VLIW control unit. However, this technique demands that all subroutine programs be prepared in advance so that some of them may be designated by program numbers. This requirement is attributable to the fact that all VLIW control units are parallelly run generally by use of 32-bit-wide RISC processor instructions. In this case, the end of execution of a given subroutine program is awaited before the next RISC processor instruction is executed. It follows that RISC processor processes and VLIW control unit processes are performed in a mutually exclusive manner. This makes it difficult to merge the two types of processes in minute increments. Furthermore, the need to change modes frequently can incur worsened processing efficiency.

Meanwhile, if a new RISC instruction set were defined in such a manner that the RISC instruction set is perfectly merged with VLIW instructions, it would be difficult to maintain compatibility with the software resources and software development environment based on past RISC instruction sets.

The present disclosure has been made in view of the above circumstances and provides a processor for efficiently merging the processing of a sequential execution portion (RISC processor) with that of a parallel execution portion (VLIW control unit).

According to an embodiment of the present disclosure, there is provided a processor including: an instruction fetch portion configured to fetch simultaneously a plurality of fixed-length instructions in accordance with a program counter; an instruction predecoder configured to predecode specific fields in a part of the plurality of fixed-length instructions; and a program counter management portion configured to control an increment of the program counter in accordance with a result of the predecoding. This structure provides the effect of facilitating control by setting the increment value of the program counter prior to the decoding of instructions.

Preferably, the specific fields may be disposed in specific bit positions common to part of fixed-length instructions. Also, the specific fields may preferably include a simultaneously issuable instruction count field indicating the number of simultaneously issuable instructions among the plurality of fixed-length instructions.

According to another embodiment of the present disclosure, there is provided a processor including: an instruction fetch portion configured to fetch simultaneously four fixed-length instructions in accordance with a program counter; an instruction predecoder configured to predecode specific fields disposed in specific bit positions common to a second and a fourth fixed-length instruction among the four fixed-length instructions; and a program counter management portion configured to exercise control in such a manner that an increment value of the program counter is set corresponding to one, two, or four of the fixed-length instructions in accordance with a result of the predecoding. This structure provides the benefit of facilitating control by setting the increment value of the program counter corresponding to one, two, or four instructions after the fetch of the four instructions and prior to the decoding of the instructions.

According to a further embodiment of the present disclosure, there is provided a processor including: an instruction fetch portion configured to fetch simultaneously a plurality of fixed-length instructions in accordance with a program counter; a sequential execution portion configured to execute sequentially specific instructions designated by operation code fields among the plurality of fixed-length instructions; a parallel execution portion configured to execute specific instructions designated by operation code fields among the plurality of fixed-length instructions in accordance with a degree of parallelism based on information indicated in specific fields; an instruction predecoder configured to predecode the specific fields in those of the fixed-length instructions which are to be executed by the parallel execution portion among the plurality of fixed-length instructions; and a program counter management portion configured to control an increment value of the program counter in accordance with a result of the predecoding. This structure provides the effect of setting the increment value of the program counter prior to the decoding of instructions and of parallelly executing the instructions based on the information indicated in the specific fields.

Preferably, the specific fields may be disposed in specific bit positions common to those of the fixed length instructions which are to be executed by the parallel execution portion. Also, the specific fields may preferably include a simultaneously issuable instruction count field indicating the number of simultaneously issuable instructions among the plurality of fixed-length instructions.

According to an even further embodiment of the present disclosure, there is provided a processor including: an instruction fetch portion configured to fetch simultaneously four fixed-length instructions in accordance with a program counter; a sequential execution portion configured to execute sequentially specific instructions designated by operation code fields among the four fixed-length instructions; a parallel execution portion configured to execute specific instructions designated by operation code fields among the four fixed-length instructions in accordance with a degree of parallelism based on information indicated in specific fields; an instruction predecoder configured to predecode the specific fields disposed in specific bit positions common to a second and a fourth fixed-length instructions which are to be executed by the parallel execution portion among the four fixed-length instructions; and a program counter management portion configured to exercise control in such a manner that an increment value of the program counter is set corresponding to one, two, or four of the fixed-length instructions in accordance with a result of the predecoding. This structure provides the effect of setting the increment value of the program counter corresponding to one, two, or four instructions after the fetch of the four fixed-length instructions and prior to the decoding of the instructions and of parallelly executing the instructions in accordance with the degree of parallelism based on the information indicated in the specific fields.

The present disclosure practiced as outlined above offers the benefit of efficiently merging the processes of the sequential execution portion such as the RISC processor with those of the parallel execution portion such as the VLIW control unit.

BRIEF DESCRIPTION OF THE DRAWINGS

FIG. 1 is a schematic view showing a typical configuration of a processor system embodying the present disclosure;

FIGS. 6, 7, and 8 are tabular views showing typical instruction issuing timings of the embodiment;

FIGS. 9, 10, 11, and 12 are schematic views showing typical values in simultaneously issuable instruction count fields corresponding to the instruction issuing timings of the embodiment;

FIG. 13 is a tabular view showing how the increment of a program counter of the embodiment is typically controlled;

FIG. 14 is a tabular view showing typical inline assembler macro instructions for use with the embodiment;

FIG. 15 is a tabular view showing the relations between inline assembler macro instructions and simultaneously issuable instruction counts in conjunction with the embodiment; and FIG. 16 is a schematic view showing a typical program written with assembler macro instructions in conjunction with the embodiment.

DETAILED DESCRIPTION OF THE PREFERRED EMBODIMENTS

Figure 2:
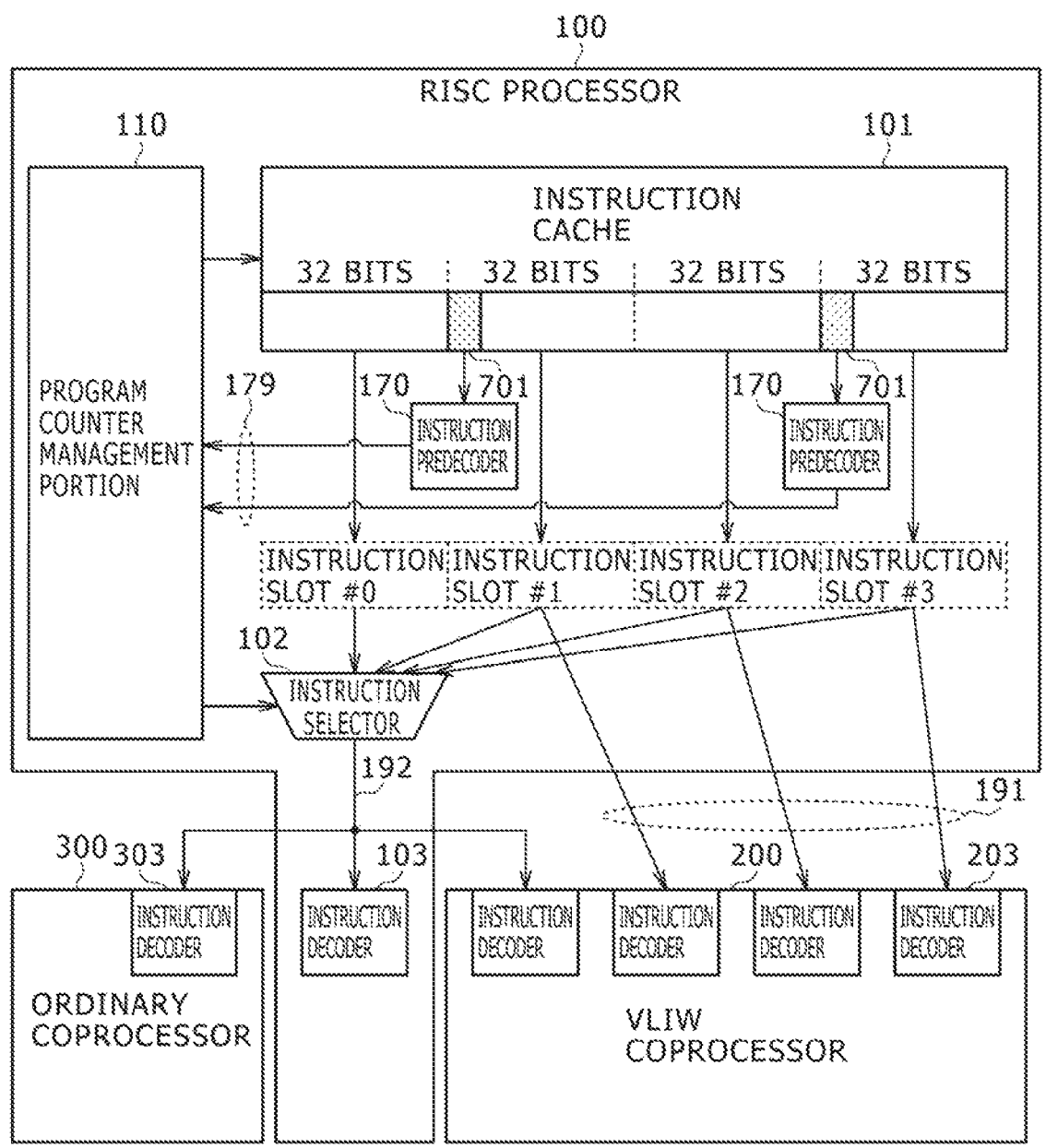
FIG. 2 is a schematic view showing a typical overall structure of an instruction issuance feature of a RISC processor as part of the embodiment.

Some preferred embodiments (simply called the embodiment hereunder) of the present disclosure will now be described. The description will be given under the following headings:
1. First embodiment (for controlling the program counter increment); and
2. Second embodiment (for setting the number of simultaneously issuable instructions using assembler macro instructions).
3. Conclusion 1. First Embodiment

[Configuration of the Processor System]

FIG. 1 is a schematic view showing a typical configuration of a processor system embodying the present disclosure. The processor system includes a RISC processor 100, a VLIW coprocessor 200, an ordinary processor 300, and a main memory 400. This embodiment envisages fetching up to four 32-bit-long instructions per cycle for parallel execution by the VLIW coprocessor, or combining the RISC processor 100 with the VLIW coprocessor 200 for parallel instruction execution. A specific example of the instruction format will be discussed later.

The RISC processor 100 serving as the main processor of the processor system may adopt the RISC architecture, for example. The RISC processor 100 connected with the main memory 400 via a memory bus 409 acquires necessary instructions and data from the main memory 400 for instruction execution processing. The RISC processor 100 is made up of an instruction cache 101, an instruction selector 102, an instruction decoder 103, a sequential execution portion 104, a register file 105, and a data cache 106.

The instruction cache 101 is a cache memory that temporarily holds the instructions read from the main memory 400. It is assumed that up to four instructions are read per cycle from the main memory 400 into the instruction cache 101. It is also assumed that up to four instructions are fed per cycle from the instruction cache 101 to the relevant components of the system. In this case, of the four instructions, the three except for the first instruction (i.e., the first, the second and the third instructions) are supplied to the VLIW coprocessor 200 via an extended instruction path 191 with an instruction length of 96 bits. Incidentally, the instruction cache 101 is an example of the instruction fetch portion described in the appended claims.

The instruction selector 102 selectively outputs one of the four instructions fed from the instruction cache 101. The instruction selected by the instruction selector 102 is targeted to be executed by one of the sequential execution portion 104 in the RISC processor 100, VLIW coprocessor 200, and ordinary coprocessor 300. When the instruction selected by the instruction selector 102 is supplied to an externally attached VLIW coprocessor 200 or ordinary processor 300, an ordinary instruction path 192 with an instruction length of 32 bits is used.

The instruction decoder 103 decodes the instruction selected by the instruction selector 102. If the result of the decoding by the instruction decoder 103 reveals that the instruction in question is targeted to be executed by the RISC processor 100, that instruction is forwarded to the sequential execution portion 104.

The sequential execution portion 104 is the instruction execution portion of the RISC processor 100. The sequential execution portion 104 performs processing using operand data held in the register file 105 in accordance with the result of the decoding by the instruction decoder 103. As needed, the result of the execution is written back to the register file 105. Also, in keeping with the result of the decoding by the instruction decoder 103, the sequential execution portion 104 reads data from the main memory 400 or from the data cache 106 and loads the operand data into the register file 105. Furthermore, in accordance with the result of the decoding by the instruction decoder 103, the sequential execution portion 104 stores the data held in the register file 105 into the main memory 400. In this case, if the data cache 106 runs under the copy-back scheme, the data is held solely in the data cache 106 without being written through to the main memory 400. In principle, the sequential execution portion 104 processes one instruction per cycle. However, this does not necessarily apply to overlapping execution between instructions in a pipeline process. That is, a plurality of instruction may appear to be processed simultaneously.

The register file 105 is a general register that holds operand data necessary for instruction execution by the sequential execution portion 104. The operand data held in the register file 105 is targeted to be read or written over by the sequential execution portion 104. Also, the register file 105 is targeted to have data loaded thereto from the main memory 400 or have the retained data stored into the main memory 400. Furthermore, the register file 105 permits register-to-register transfer of data to or from the register file of another coprocessor. The data transfer between the registers is performed using a path 195.

The data cache 106 is a cache memory that temporarily holds the data read from the main memory 400. If the data cache 106 runs under the copy-back scheme, there may apparently occur a mismatch with the main memory. However, control is exercised so that logical consistency of their content is maintained between the two memories. The VLIW coprocessor 200 and ordinary coprocessor 300 also use the data cache 106 so that the cache 106 temporarily holds their data. It is assumed that one data item (of 32 bits) is fed per cycle from the data cache 106 to the register file 105 or to the ordinary coprocessor 300. It is further assumed that four data items (of 128 bits) are supplied per cycle from the data cache 106 to the VLIW coprocessor 200.

The VLIW coprocessor 200 acting as a coprocessor of the RISC processor 100 carries out parallel instruction execution under VLIW control. The VLIW coprocessor 200 includes a parallel instruction decoder 203, a parallel execution portion 204, and a register file 205.

The parallel instruction decoder 203 decodes the instructions fed from the RISC processor 100. In addition to a signal of a single instruction over the ordinary instruction path 192, the RISC processor 100 may supply signals of three instructions over the extended instruction path 191. That is, the parallel instruction decoder 203 can be supplied with signals of up to four instructions per cycle. The parallel instruction decoder 203 has the capability of decoding up to four instructions per cycle.

The parallel execution portion 204 is the instruction execution portion of the VLIW coprocessor 200. The parallel execution portion 204 has the capability of parallelly executing up to four instructions per cycle. As will be discussed later, if an operation code field indicates a VLIW coprocessor instruction, the parallel execution portion 204 performs a VLIW coprocessor instruction in accordance with a degree of parallelism based on information indicated in a simultaneously issuable instruction count field.

The register file 205 is a register that holds operand data necessary for instruction execution by the parallel execution portion 204. The register file 205 may be supplied with up to four instructions (of 128 bits) per cycle from the data cache 106 over the path 196. The operand data held in the register file 205 is targeted to be read or written over by the parallel execution portion 204. Also, the register file 205 permits register-to-register transfer of data to or from the register file of the RISC processor 100 or of the ordinary processor 300. The data transfer between the registers is performed using the path 195.

The ordinary coprocessor 300 performs other processes as a coprocessor of the RISC processor 100. For example, a floating-point coprocessor may be utilized as the ordinary coprocessor 300. The ordinary coprocessor 300 includes an instruction decoder 303 and a register file 305, among others.

The instruction decoder 303 decodes instructions supplied from the RISC processor 100. The RISC processor 100 feeds the signal of a single instruction per cycle to the instruction decoder 303 over the ordinary instruction path 192.

The register file 305 is a register that holds operand data necessary for instruction execution by an execution portion (not shown) inside the ordinary coprocessor 300. The register file 305 may be supplied with one instruction (of 32 bits) per cycle from the data cache 106 over a path 197 as part of the path 196.

[Structure of the Instruction Issuance Feature]

FIG. 2 is a schematic view showing a typical overall structure of the instruction issuance feature of the RISC processor 100 as part of the embodiment. The RISC processor 100 has two instruction predecoders 170 interposed between the instruction cache 101 and instruction decoder 103 shown in FIG. 1. Also, the RISC processor 100 includes a program counter management portion 110 that manages a program counter for program execution.

The instruction predecoders 170 predecode specific fields 701 in the second and the fourth instructions out of the four instructions read simultaneously (i.e., fetched) from the instruction cache 101. The first and the third instructions may also contain specific fields 701 which, however, need not be predecoded. In this context, predecoding refers to the decoding carried out prior to the decoding of instructions by the instruction decoder 103.

The specific fields 701 targeted to be predecoded include an operation code field and a simultaneously issuable instruction count field. The operation code field indicates the instruction type, and one such instruction type includes a VLIW coprocessor instruction. The VLIW coprocessor instruction is an instruction to be processed by the VLIW coprocessor 200. In the case of the VLIW coprocessor instruction, the simultaneously issuable instruction count field indicates the number of instructions simultaneously issuable to the VLIW coprocessor 200. In accordance with the simultaneously issuable instruction count field, the program counter management portion 110 performs program counter control and the parallel execution portion 204 of the VLIW coprocessor 200 carries out parallel execution control. The result of the predecoding by the instruction predecoders 170 is sent to the program counter management portion 110 via a signal line 179.

The four instructions read simultaneously from the instruction cache 101 are managed as four instruction slots #0 through #3. That is, the first instruction is handled as instruction slot #0, the second instruction as instruction slot #1, the third instruction as instruction slot #2, and the fourth instruction as instruction slot #3. These instructions may either be held temporarily in instruction slot registers or be managed without resorting to such registers. Three instructions ranging from instruction slot #1 to instruction slot #3 are fed to the VLIW coprocessor 200 via the extended instruction path 191. One of the four instructions ranging from instruction slot #0 to instruction slot #3 is selected by the instruction selector 102. The selected instruction is sent via the ordinary instruction path 192 to the RISC processor 100 or to the instruction decoder of the VLIW coprocessor 200 or of the ordinary coprocessor 300.

The program counter management portion 110 controls the increment of the program counter in the RISC processor 100 in accordance with the result of the predecoding by the instruction predecoders 170. If the operation code field indicates an ordinary instruction other than the VLIW coprocessor instruction, the increment of the program counter is set corresponding to one instruction. If the operation code field indicates the VLIW coprocessor instruction, then the increment value of the program counter is determined in accordance with the simultaneously issuable instruction count fields of instruction slots #1 and #3. The program counter value managed by the program counter management portion 110 is fed to the instruction cache 101, whereby four instructions headed by the address indicated by the program counter are fetched.

Also, the program counter management portion 110 provides selective control on the instruction selector 102 in accordance with the result of the predecoding. As with control over the program counter increment, the program counter management portion 110 causes the instruction selector 102 to select one instruction at a time starting from instruction slot #0 when the operation code field indicates an ordinary instruction other than the VLIW coprocessor instruction. If the operation code field indicates the VLIW coprocessor instruction, then the program counter management portion 110 causes the instruction selector 102 to select relevant instructions in accordance with the simultaneously issuable instruction count fields in instruction slots #1 through #3.

Figure 3:
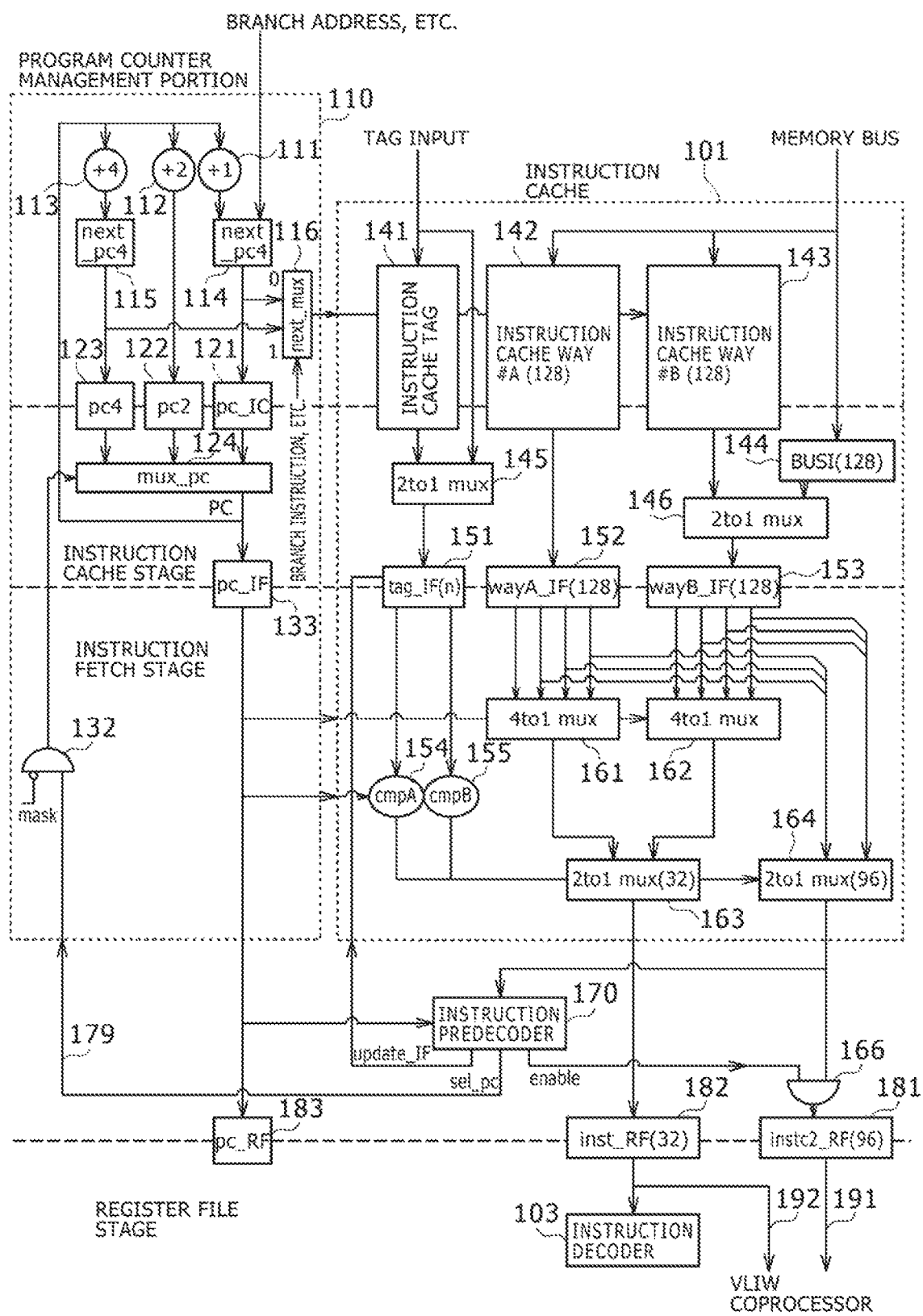
FIG. 3 is a schematic view showing a typical detailed structure of the RISC processor as part of the embodiment.

FIG. 3 is a schematic view showing a typical detailed structure of the RISC processor 100 as part of the embodiment. This structure example indicates an instruction cache stage, an instruction fetch stage, and a register file stage in an instruction pipeline of the RISC processor 100. The instruction cache stage is a stage where the memory portion of the instruction cache is accessed in keeping with the program counter. The instruction fetch stage is a stage where the instructions read from the memory portion are subjected to selection. The register file stage is a stage where the fetched instructions are decoded and their operation data is acquired. The instruction cache 101 and program counter management portion 110 straddle the instruction cache stage and instruction fetch stage. The instruction predecoders 170 belong to the instruction fetch stage, while the instruction decoder 103 belongs to the register file stage.

For the structure example above, it is assumed that the instruction addresses of the group of simultaneously issuable instructions were aligned at the time of software development. That is, the addresses are assumed to be aligned on a two-word boundary when two instructions are to be issued simultaneously, or on a four-word boundary when four instructions are to be issued simultaneously. It follows that in the above structure, the instructions fetched in different cycles cannot be issued simultaneously.

The program counter management portion 110 includes program counter latches 114, 115, 121 through 123, and 133; adders 111 through 113, program counter multiplexers 116 and 124, and an AND gate 132.

The adder 111 increments the current program counter by "1" corresponding to one instruction. The adder 112 increments the current program counter by "2" corresponding to two instructions. The adder 113 increments the current program counter by "4" corresponding to four instructions.

The program counter latch 114 selectively latches the output of the adder 111, a branch destination address, or an exception handling program address. The program counter latch 115 latches the output of the adder 113. The program counter latch 121 latches the value of the program counter latch 114 as the latch for the instruction cache stage. The program counter latch 122 latches the output of the adder 112 as the latch for the instruction cache stage. The program counter latch 123 latches the value of the program counter latch 115 as the latch for the instruction cache stage. The program counter latch 133 latches the output of the program counter multiplexer 124 as the latch for the instruction fetch stage.

The AND gate 132 masks the result of the predecoding (on the signal line 179) by the instruction predecoders 170 using a mask signal. The output of the AND gate 132 is sent to a selective signal input of the program counter multiplexer 124. The program counter multiplexer 124 selects one of the values in the program counter latches 121 through 123 in accordance with the selective signal input and outputs the selected value as the current program counter value. The program counter multiplexer 116 selects the output of the program counter latch 114 or 115 in accordance with the instruction type, and feeds the selected output to the instruction cache 101.

The instruction cache 101 includes an instruction cache tag memory 141, instruction cache way memories 142 and 143, a bus interface 144, and multiplexers 145 and 146. The instruction cache 101 also includes a cache tag latch 151, cache data latches 152 and 153, comparators 154 and 155, and multiplexers 161 through 164.

The instruction cache tag memory 141 is a cache tag of the instruction cache 101. As such, the instruction cache tag memory 141 holds the tag part of the instruction address. The instruction cache tag memory 141 outputs a relevant entry in accordance with the program counter value supplied from the program counter multiplexer 116. The instruction cache way memories 142 and 143 are memories that hold the instructions from the main memory 400. In this example, a two-way set associative memory arrangement is assumed. When the instruction cache way memories 142 and 143 store the instructions coming from the main memory 400, the instruction cache tag memory 141 stores the tag part into the corresponding entry.

The bus interface 144 connected with the memory bus 409 acquires instructions from the main memory 400. When the instruction cache way memory 142 or 143 is to be filled with an instruction at instruction cache miss time, the bus interface 144 is used to transmit the instruction in question to the instruction pipeline. The multiplexer 145 is used to select the tag part while the multiplexer 146 is used to select the instruction.

The cache tag latch 151 latches the output of the multiplexer 145. The cache data latch 152 latches the output of the instruction cache way memory 142. The cache data latch 153 latches the output of the multiplexer 146.

The comparators 154 and 155 compare the tag part held in the instruction cache tag memory 141 with the program counter. If at least one of the comparators 154 and 155 detects a match, there is a possibility of a cache hit. If both of the comparators 154 and 155 detect a mismatch, that means a cache miss hit has occurred.

The multiplexers 161 and 162 select one instruction (of 32 bits) out of the four instructions (of 128 bits) held in the cache data latches 152 and 153, respectively. The multiplexer 161 and 162 correspond to the instruction selector 102 shown in FIGS. 1 and 2.

The multiplexer 163 selects the output of the multiplexer 161 or 162 in accordance with the result of the comparisons made by the comparators 154 and 155. The multiplexer 164 selects the latter 96 bits of the output from the cache data latch 152 or 153 in accordance with the result of the comparisons made by the comparators 154 and 155. That is, the multiplexers 163 and 164 select either of two-way instruction caches. The multiplexer 163 selects the way of one instruction (32 bits), and the multiplexer 164 selects the way of three instructions (96 bits).

As discussed above, the instruction predecoders 170 predecode the specific fields 701 in the second and the fourth instructions out of the four instructions. The specific fields 701 are included in the output of the multiplexer 164. The instruction predecoders 170 send the program counter increment value (sel_PC) as the result of their predecoding to the program counter management portion 110 via the signal line 179. If the VLIW coprocessor instruction is detected, the instruction predecoders 170 output an enable signal that enables the issuance of instructions to the VLIW coprocessor 200. Given the enable signal from the instruction predecoders 170, the AND gate 166 masks the output of the multiplexer 164 (i.e., three instructions). That is, if the VLIW coprocessor instruction is detected, the three instructions are output unchecked; if an instruction other than the VLIW coprocessor instruction is detected, the three instructions are masked.

A latch 181 latches the latter three of the four fetched instructions. A latch 182 latches the first one of the four fetched instructions. A latch 183 latches the program counter. The output of the latch 181 is connected to the extended instruction path 191, and the output of the latch 182 is connected to the ordinary instruction path 192. The output of the latch 182 is also fed to the instruction decoder 103. That is, the above-described instruction predecoders 170 are disposed upstream of the instruction decoder 103.

[Instruction Format]

Figure 4:
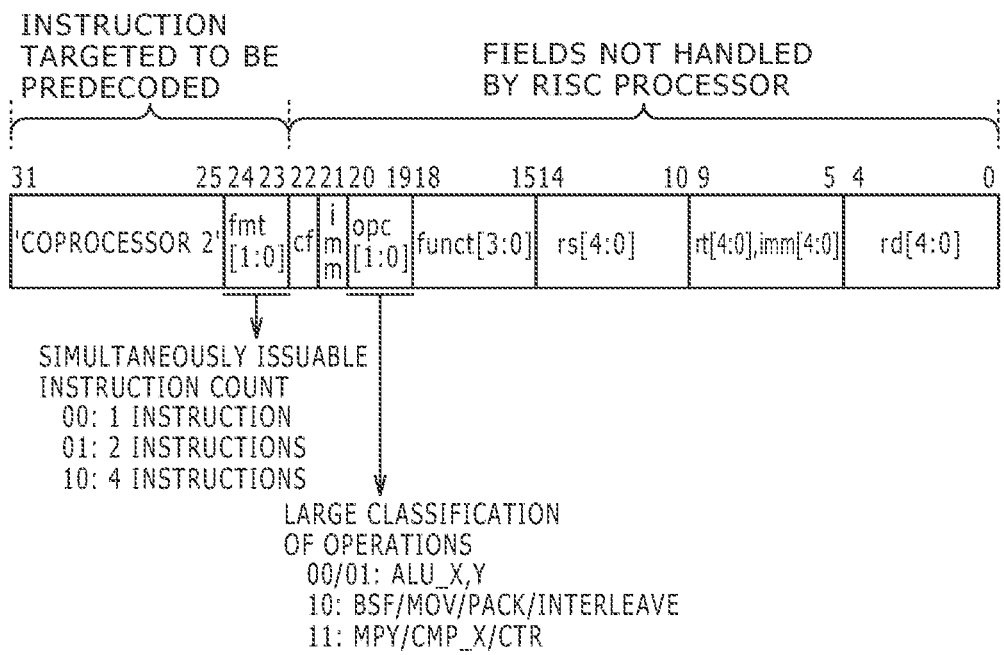
FIGS. 4 and 5 are schematic views showing a typical instruction format for use with the embodiment.
Figure 5:
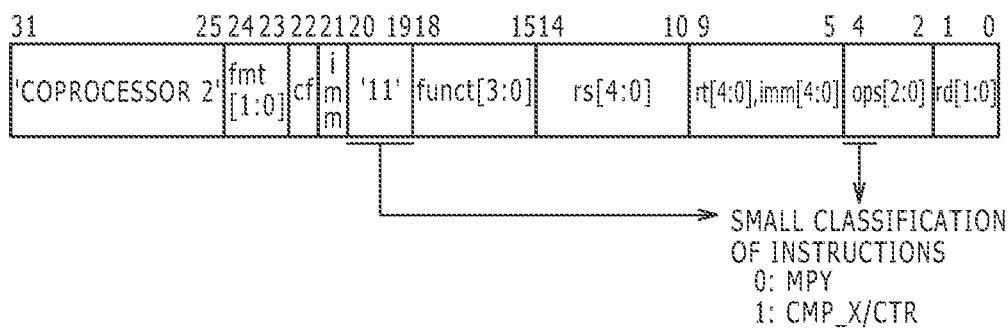

FIGS. 4 and 5 are schematic views showing a typical instruction format for use with the embodiment. As shown in FIG. 4, 32-bit-long instructions are assumed for the embodiment. Seven bits ranging from bit 31 to bit 25 constitute the operation code field. In this example, a VLIW coprocessor instruction (coprocessor 2 instruction) is shown to be designated. That is, the VLIW coprocessor 200 is positioned as the second coprocessor to which the RISC processor 100 can be originally connected, and is subjected to execution control when the coprocessor 2 instruction is defined as the VLIW coprocessor instruction. In principle, the main body of the VLIW coprocessor instruction (of 25 bits ranging from bit 24 to bit 0) is interpreted solely by the coprocessor 2, i.e., by the VLIW coprocessor 200. With this embodiment, however, bits 24 and 23 are also referenced by the RISC processor 100 as will be discussed later. Although the VLIW coprocessor 200 is defined here as the second coprocessor, this is only an example.

A two-bit field fmt composed of bits 24 and 23 is a field that indicates the number of simultaneously issuable instructions. Specifically, if the simultaneously issuable instruction count field is "00," only one instruction is to be issued; if the simultaneously issuable instruction count field is "01," two instructions are to be issued simultaneously; if the simultaneously issuable instruction count field is "10," four instructions are to be issued simultaneously. In accordance with the value of the simultaneously issuable instruction count field, the program counter management portion 110 controls the program counter increment while the VLIW coprocessor 200 determines the degree of parallelism in instruction execution. If solely VLIW coprocessor instructions are to be issued simultaneously, the value of the simultaneously issuable instruction count field is equal to the degree of instruction execution parallelism for the VLIW coprocessor 200. If a RISC instruction and a VLIW coprocessor instruction are to be issued simultaneously, then the value of the simultaneously issuable instruction count field minus "1" is equal to the degree of instruction execution parallelism for the VLIW coprocessor 200. The VLIW coprocessor instruction in the group of simultaneously issuable instructions indicates the same value in the simultaneously issuable instruction count field. It should be noted, however, that all instruction values need not necessarily be referenced because the value of one instruction can be estimated from the value of another instruction within the instruction group, as will be discussed later. In the ensuing description, the value "00" denoting one instruction may be indicated as "1," the value "01" representing two instructions as "2," and the value "10" indicating four instructions as "4" for purpose of simplification.

One-bit flag cf composed of bit 22 is a condition flag that specifies whether or not to execute the instruction of interest depending on the result of a preceding comparison instruction. For example, if the cf bit of a given instruction is "1," the instruction in question is executed where the result of the preceding comparison instruction is "true" and is not executed (NOP) where the result of the preceding comparison instruction is "false." If the cf bit is "0," the instruction in question is always executed. A single bit imm composed of bit 21 indicates whether bit 9 through bit 5 constitute an immediate operand or a second source operand rt. If the imm bit is "1," it indicates a five-bit immediate operand.

A two-bit field opc composed of bits 20 and 19 indicates a large classification of the operation types of VLIW coprocessor instructions. For example, if the opc field is "00" or "01," it indicates ALU operation (ALU_X, Y). If the opc field is "10," it indicates bit shift operation (BSF), movement (MOV), or pack operation (PACK). If the opc field is "11," it indicates multiplication (MPY) or comparison (CMP_X). For example, if the opc field is "11," then bit 4 indicates a small classification of instructions as shown in FIG. 4.

A four-bit field funct ranging from bit 18 to bit 15 indicates function. The handling of the funct field differs from one operation type to another.

A five-bit field ranging from bit 14 to bit 10 indicates a first source operand rs. A five-bit field ranging from bit 9 to bit 5 indicates a second source operand rt or an immediate operand imm. A five-bit field ranging from bit 4 to bit 0 indicates a destination operand rd.

Of these bit fields, the nine bits ranging from bit 31 to bit 23 are subject to predecoding by the instruction predecoders 170. That is, the instruction predecoders 170 predecode both the operation code field disposed in specific bit positions common to the instructions and the simultaneously issuable instruction count field. All other fields are to be decoded by the VLIW coprocessor 200 and are irrelevant to the RISC processor 100.

[Instruction Issuing Timings]

FIGS. 6, 7, and 8 are tabular views showing typical instruction issuing timings of the embodiment. FIG. 6 shows three patterns of four simultaneously issued instructions; FIG. 7 indicates three patterns of two simultaneously issued instructions; and FIG. 8 depicts three patterns of one issued instruction.

In a first pattern of four instructions being simultaneously issued, all four instruction slots are taken by VLIW coprocessor instructions. With this pattern, the first one instruction is issued via the ordinary instruction path 192 and the remaining three instructions are issued via the extended instruction path 191. This allows the VLIW coprocessor 200 to execute four instructions in parallel.

In a second pattern of four instructions being simultaneously issued, the first slot alone is taken by a RISC instruction and the latter three slots are held by VLIW coprocessor instructions. With this pattern, the latter three instructions are issued via the extended instruction path 191 to the VLIW coprocessor 200. At the same time as one instruction is executed by the RISC processor 100, the remaining three instructions are executed parallelly by the VLIW coprocessor 200.

In a varied pattern of four instructions being simultaneously issued, the first slot alone may be taken by a RISC-VLIW transfer instruction and the latter three slots may be held by VLIW coprocessor instructions. With this pattern, at the same time as the RISC-VLIW transfer instruction is executed by the RISC processor 100, the remaining three instructions are executed parallelly by the VLIW coprocessor 200.

In a first pattern of two instructions being simultaneously issued, the first two instruction slots are taken by VLIW coprocessor instructions. With this pattern, the first one instruction is issued via the ordinary instruction path 192, and the subsequent one instruction is issued via the extended instruction path 191. This allows the VLIW coprocessor 200 to execute two instructions parallelly.

In a second pattern of two instructions being simultaneously issued, the first slot is taken by a RISC instruction and the subsequent one slot by a VLIW coprocessor instruction. With this pattern, the subsequent one instruction is issued via the extended instruction path 191 to the VLIW coprocessor 200. At the same time as one instruction is executed by the RISC processor 100, the other instruction is executed by the VLIW coprocessor 200.

In a varied pattern of two instructions being simultaneously issued, the first slot may be taken by a RISC-VLIW transfer instruction and the subsequent one slot by a VLIW coprocessor instruction. With this pattern, one instruction is executed by the VLIW coprocessor 200 at the same time as the RISC-VLIW transfer instruction is executed by the RISC processor 100.

In a first pattern of one instruction being issued, the first instruction slot is taken by a VLIW coprocessor instruction that is executed singly. With this pattern, the first one instruction is issued via the ordinary instruction path 192. This allows the VLIW coprocessor 200 to execute one instruction.

In a second pattern of one instruction being issued, the first slot is taken by a RISC instruction and the subsequent slot by an instruction that cannot be executed simultaneously. With this pattern, the subsequent instruction is targeted to be executed in the next cycle. The same holds for a varied pattern of one RISC-VLIW transfer instruction being issued.

As will be understood from the foregoing description, this embodiment presupposes that when a RISC instruction and a VLIW instruction are to be issued simultaneously, the RISC instruction is disposed in instruction slot #0. Meeting this precondition helps simplify the structure of the instruction predecoders 170.

FIGS. 9, 10, 11, and 12 are schematic views showing typical values in the simultaneously issuable instruction count fields corresponding to the instruction issuing timings of the embodiment.

When the four fetched instructions are to be issued simultaneously, the simultaneously issuable instruction count field has the value "4" in both instruction slot #1 and instruction slot #3 as shown in FIG. 9. In this case, it is sufficient to reference the simultaneously issuable instruction count field in instruction slot #1 only; there is no particular need to reference the simultaneously issuable instruction count field in instruction slot #3. Although the simultaneously issuable instruction count field in both instruction slot #0 and instruction slot #2 is estimated to have the value "4" as well, these fields need not be referenced.

Suppose that of the four fetched instructions, the first two instructions are to be issued simultaneously followed by simultaneous issuing of the subsequent two instructions. In such a case, as shown in FIG. 10, the simultaneously issuable instruction count field has the value "2" in both instruction slot #1 and instruction slot #3. The simultaneously issuable instruction count field in instruction slot #1 indicates that the first two instructions are to be issued simultaneously, and the simultaneously issuable instruction count field in instruction slot #3 shows that the subsequent two instructions are to be issued simultaneously. Although the simultaneously issuable instruction count field in both instruction slot #0 and instruction slot #2 is estimated to have the value "2" as well, these fields need not be referenced.

Suppose that of the four fetched instructions, the first two instructions are to be issued simultaneously followed by sequential issuing of the subsequent two instructions. In such a case, as shown in FIG. 11, the simultaneously issuable instruction count field in instruction slot #1 has the value "2" indicating that the first two instructions are to be issued simultaneously. The simultaneously issuable instruction count field in instruction slot #3 has the value "1" indicating that the subsequent two instructions are to be issued sequentially. Although the simultaneously issuable instruction count field is estimated to have the value "2" in instruction slot #0 and to have the value "1" in instruction slot #2, these fields need not be referenced.

Suppose that of the four fetched instructions, the first two instructions are to be issued sequentially followed by simultaneous issuing of the subsequent two instructions. In such a case, as shown in FIG. 12, the simultaneously issuable instruction count field in instruction slot #1 has the value "1" while the simultaneously issuable instruction count field in instruction slot #3 has the value "2." The simultaneously issuable instruction count field in instruction slot #1 indicates that the first two instructions are to be issued sequentially, and the simultaneously issuable instruction count field in instruction slot #3 shows that the subsequent two instructions are to be issued simultaneously. Although the simultaneously issuable instruction count field is estimated to have the value "1" in instruction slot #0 and to have the value "2" in instruction slot #2, these fields need not be referenced.

[Increment Control on the Program Counter]

FIG. 13 is a tabular view showing how the increment of the program counter of the embodiment is typically controlled.

When the simultaneously issuable instruction count field in instruction slot #1 or #3 gives the value "4," the increment value of the program counter is set corresponding to four instructions. This causes the next four instructions to be fetched simultaneously. If the simultaneously issuable instruction count field in either instruction slot #1 or instruction slot #3 has the value "4," the simultaneously issuable instruction count field in the other instruction slot always has the same value "4" as well. Thus in this case, it is sufficient to reference either of the two instruction slots.

If the simultaneously issuable instruction count field in both instruction slot #1 and instruction slot #3 gives the value "2," the increment value of the program counter is set corresponding to two instructions in the first cycle and two instructions in the next cycle. Thereafter the next four instructions are fetched simultaneously.

If the simultaneously issuable instruction count field in instruction slot #1 has the value "2" and the simultaneously issuable instruction count field in instruction slot #3 has the value "1," the increment value of the program counter is set corresponding to two instructions in the first cycle, one instruction in the next cycle, and one instruction in the next cycle. Thereafter the next four instructions are fetched simultaneously.

If the simultaneously issuable instruction count field in instruction slot #1 has the value "1" and the simultaneously issuable instruction count field in instruction slot #3 has the value "2," the increment value of the program counter is set corresponding to one instruction in the first cycle, one instruction in the next cycle, and two instructions in the next cycle. Thereafter the next four instructions are fetched simultaneously.

If the simultaneously issuable instruction count field in both instruction slot #1 and instruction slot #3 gives the value "1," the increment value of the program counter is set corresponding to one instruction in each of four repeated cycles because the four instructions are issued one at a time. Thereafter the next four instructions are fetched simultaneously.

According to the first embodiment described above, the instruction predecoders 170 predecode the simultaneously issuable instruction count fields in VLIW coprocessor instructions, thereby easily controlling the increment of the program counter. This makes it possible to issue multiple RISC instructions and VLIW coprocessor instructions simultaneously in units of a cycle, whereby the RISC processor 100 and the VLIW coprocessor 200 can be operated simultaneously.

2. Second Embodiment

The first embodiment above was shown to use the technique of controlling the program counter increment by predecoding the simultaneously issuable instruction count field. The second embodiment to be explained below utilizes the technique of setting the simultaneously issuable instruction count field through the use of assembler macro instructions. The hardware structures and instruction sets on the machine language level are common to the first and the second embodiments. The technique of generating machine language codes using assembler macro instructions is only an example. Alternatively, it is possible automatically to generate machine language codes including the above-mentioned simultaneously issuable instruction count field by getting the C compiler or the like automatically to extract those parts of a pure C program or like sources which can be executed parallelly so that these parts are automatically mapped into VLIW instructions.

[Inline Assembler Macro Instructions]

FIG. 14 is a tabular view showing typical inline assembler macro instructions for use with the embodiment. Listed in FIG. 14 are some of the representative inline assembler macro instructions used by the second embodiment. Other diverse inline assembler macro instructions may be devised and adopted for use with the embodiment.

The VliwAlign4 inline assembler macro instruction is an inline assembler macro for four-word alignment. This inline assembler macro is used to align the subsequent assembler instruction with a four-word boundary. In this case, the compiler may insert an NOP (No Operation) instruction as needed.

The VliwAlign2 inline assembler macro instruction is an inline assembler macro for two-word alignment. This inline assembler macro is used to align the subsequent assembler instruction with a two-word boundary. In this case, as with the VliwAlign4 inline assembler macro instruction, the compiler may insert an NOP (No Operation) instruction as needed.

The VliwQ4 inline assembler macro instruction is a VLIW coprocessor instruction macro for simultaneously issuing four VLIW coprocessor instructions. This VLIW coprocessor instruction macro causes the value "10" indicating four instructions to be set in the simultaneously issuable instruction count field of the designated four VLIW coprocessor instructions.

The VliwQ3 inline assembler macro instruction is a VLIW coprocessor instruction macro for simultaneously issuing one RISC instruction and three VLIW coprocessor instructions. This VLIW coprocessor instruction macro causes the value "10" indicating four instructions to be set in the simultaneously issuable instruction count field of the designated three VLIW coprocessor instructions. Alternatively, the RISC instruction may be replaced by a RISC-VLIW communication inline assembler macro instruction for the simultaneous issuance.

The VliwD2 inline assembler macro instruction is a VLIW coprocessor instruction macro for simultaneously issuing two VLIW coprocessor instructions. This VLIW coprocessor instruction macro causes the value "01" indicating two instructions to be set in the simultaneously issuable instruction count field of the designated two VLIW coprocessor instructions.

The VliwD1 inline assembler macro instruction is a VLIW coprocessor instruction macro for simultaneously issuing one RISC instruction and one VLIW coprocessor instruction. This VLIW coprocessor instruction macro causes the value "01" indicating two instructions to be set in the simultaneously issuable instruction count field of the designated one VLIW coprocessor instruction. Alternatively, the RISC instruction may be replaced by a RISC-VLIW communication inline assembler macro instruction for the simultaneous issuance.

The Vliw inline assembler macro instruction is a VLIW coprocessor instruction macro for singly issuing one VLIW coprocessor instruction. This VLIW coprocessor instruction macro causes the value "00" indicating one instruction to be set in the simultaneously issuable instruction count field of the designated one VLIW coprocessor instruction.

The RISC-VLIW communication inline assembler macro instructions may include such inline assembler macro instructions as Vliw_LD, Vliw_ST, Vliw_MT, and Vliw_MF, for example. The Vliw_LD inline assembler macro instruction may be replaced by one instruction for directly loading data from a RISC data cache into a Vliw coprocessor register. The Vliw_ST inline assembler macro instruction may be replaced by one instruction for directly storing data from the Vliw coprocessor register into the RISC data cache. The Vliw_MT inline assembler macro instruction may be replaced by one instruction for moving data from a RISC register file into the Vliw coprocessor register. The Vliw_MF inline assembler macro instruction may be replaced by one instruction for moving data from the Vliw coprocessor register into the RISC register file. These RISC-VLIW communication inline assembler macro instructions permit data communication between the RISC processor 100 and the VLIW coprocessor 200.

The_addu_inline assembler macro instruction is a RISC instruction inline assembler macro for designating an addition operation. This_addu_inline assembler macro instruction is shown here as a typical RISC instruction inline assembler macro. Many other RISC instruction inline assembler macros may be devised and utilized.

[Inline Assembler Macro Instructions and Simultaneously Issuable Instruction Counts]

FIG. 15 is a tabular view showing the relations between inline assembler macro instructions and simultaneously issuable instruction counts in conjunction with the embodiment. Although the table lists the simultaneously issuable instruction counts of all instruction slots #0 through #3, it is instruction slots #1 and #3 that are actually referenced.

In the case of the VliwQ4 inline assembler macro instruction, the simultaneously issuable instruction count of instruction slots #0 through #3 is set to "10" indicating four instructions. In the case of the combination of a RISC instruction with the VliwQ3 inline assembler macro instruction, the simultaneously issuable instruction count of instruction slots #1 through #3 is set to "10" indicating four instructions. It should be noted that nothing is set in the RISC instruction of instruction slot #0 because there exists no relevant field.

In the case of the VliwD2 inline assembler macro instruction, the simultaneously issuable instruction count of instruction slots #0 and #1 is set to "01" indicating two instructions. In the case of the combination of a RISC instruction with the VliwD1 inline assembler macro instruction, the simultaneously issuable instruction count of instruction slot #1 is set to "01" indicating two instructions, but nothing is set in the RISC instruction of instruction slot #0 because there exists no relevant field. In these cases, the simultaneously issuable instruction count of instruction slots #2 and #3 is set to "01" indicating two instructions or "00" indicating one instruction depending on the subsequent instruction. That is, the simultaneously issuable instruction count is set to "01" indicating two instructions if the subsequent instruction is the VliwD2 inline assembler macro instruction, or "00" indicating one instruction if the subsequent instruction is the Vliw inline assembler macro instruction.

In the case of the Vliw inline assembler macro instruction, the simultaneously issuable instruction count of instruction slots #0 and #1 is set to "00" indicating one instruction. The simultaneously issuable instruction count of instruction slots #2 and #3 is set to "01" indicating two instructions or "00" indicating one instruction depending on the subsequent instruction. That is, the simultaneously issuable instruction count is set to "01" indicating two instructions if the subsequent instruction is the VliwD2 inline assembler macro instruction, or "00" indicating one instruction if the subsequent instruction is the Vliw inline assembler macro instruction.

[Program Based on Inline Assembler Macro Instructions]

FIG. 16 is a schematic view showing a typical program written with assembler macro instructions in conjunction with the embodiment. This program example is written in C language using inline assembler macro instructions. The "include" statement at the top is a statement that invokes an inline assembler macro definition file. The statement is followed by sample codes. Below is a line-by-line explanation of the main body of a loop that uses a "for" statement.

The first line of the loop body is the VliwAlign4 inline assembler macro instruction for aligning a second-line instruction with a four-word boundary. The second line is composed of a RISC instruction (_addu_inline assembler macro instruction) and the VliwQ3 inline assembler macro instruction. The VliwQ3 inline assembler macro instruction designates three VLIW coprocessor instructions: Vliw_SUB instruction, Vliw_ADD instruction, and Vliw_nop instruction. The second line causes one RISC instruction and the three VLIW coprocessor instructions to be issued simultaneously.

The third line is composed of the VliwQ4 inline assembler macro instruction designating four VLIW coprocessor instructions: Vliw_ADD instruction, Vliw_SUB instruction, Vliw_nop instruction, and Vliw_nop instruction. The third line causes the four VLIW coprocessor instructions to be issued simultaneously.

The fourth line is composed of the Vliw_ST inline assembler macro instruction and VliwQ3 inline assembler macro instruction. The VliwQ3 inline assembler macro instruction designates three VLIW coprocessor instructions: Vliw_SUB instruction, Vliw_ADD instruction, and Vliw_nop instruction. The fourth line causes one RISC-VLIW communication instruction and the three VLIW coprocessor instructions to be issued simultaneously.

The fifth line constitutes an addition in C language. The C compiler is expected automatically to map this process into a RISC addition instruction. This addition instruction is executed by the sequential execution portion 104 in the RISC processor 100.

The sixth and the seventh lines are the Vliw inline assembler macro instruction each. These Vliw inline assembler macro instructions are issued individually to the VLIW coprocessor 200.

The eighth line is composed of the VliwAlign2 inline assembler macro instruction for aligning a ninth-line instruction with a two-word boundary. The ninth line is composed of the VliwD2 inline assembler macro instruction designating two VLIW coprocessor instructions: Vliw_vsrami instruction and Vliw_MUL instruction. The ninth line causes the two VLIW coprocessor instructions to be issued simultaneously.

The tenth line is composed of a RISC instruction (_addu_inline assembler macro instruction) and the VliwD1 inline assembler macro instruction. The VliwD1 inline assembler macro instruction designates the Vliw_MUL instruction as a VLIW coprocessor instruction. The tenth line causes one RISC instruction and one VLIW coprocessor instruction to be issued simultaneously.

According to the second embodiment described above, the inline assembler macro instructions are used to specify instruction alignments and groups of simultaneously issuable instructions. This makes it easy to set the value of the simultaneously issuable instruction count field in VLIW coprocessor instructions.

3. Conclusion

As discussed above, the embodiments of the present disclosure facilitate control of the program counter increment through predecoding by the instruction predecoders 170. This allows multiple RISC instructions and VLIW coprocessor instructions to be issued simultaneously in units of a cycle, whereby the RISC processor 100 and VLIW coprocessor 200 can simultaneously perform the processes they respectively excel in. For example, the VLIW coprocessor 200 may carry out parallel data operations while the RISC processor 100 is calculating the memory address (pointer) of the data necessary for the next VLIW operation. Also, the RISC processor 100 may process or decide on the results of VLIW operations already transferred to the RISC or may perform an entirely different process.

Furthermore, it is possible to issue multiple RISC-VLIW communication instructions and VLIW coprocessor instructions simultaneously in units of a cycle. This makes it possible simultaneously to accomplish a VLIW coprocessor operation in a given cycle and the supply of the data (from the RISC data cache or RISC register file) necessary for a subsequent VLIW coprocessor operation. In this manner, the VLIW coprocessor can continuously perform its operations in each cycle without waiting for the supply of data from the RISC.

In practice, however, it may not be easy to let the VLIW coprocessor run in a seamlessly continuous manner given the ratio of one RISC instruction (or RISC-VLIW communication instruction) and up to three VLIW instructions. In that sense, an effective extension of the present disclosure may be implemented to have as many as N RISC instructions and N VLIW instructions issued simultaneously.

Also according to the embodiments of the present disclosure, the number of simultaneously issuable VLIW coprocessor instructions is variable; the instruction count may be 1, 2 or 4. This makes it possible to have fewer empty slots than with the fixed-length VLIW coprocessor, whereby instruction density can be improved.

Also according to the embodiments of the present disclosure, the simultaneously issuable instruction count field is designated in the main body of VLIW coprocessor instructions. This makes it possible to maintain compatibility with past software resources that use only RISC instructions.

Also according to the embodiments of the present disclosure, the simultaneously issuable instruction count field is used to simplify control of the program counter increment. Even though the instruction predecoders 170 are added anew, operating frequency is not dropped, so that high-speed performance is still available.

The embodiments and their variations described above are merely examples in which the present disclosure may be implemented. As is clear from above, the particulars of the embodiments and their variations in the description of the preferred embodiments correspond basically to the disclosed matters claimed in the appended claims. Likewise, the disclosed matters named in the appended claims correspond basically to the particulars with the same names in the description of the preferred embodiments. However, these embodiments and their variations and other examples of the present disclosure are not limitative thereof, and it should be understood by those skilled in the art that various modifications, combinations, sub-combinations and alterations may occur depending on design requirements and other factor in so far as they are within the scope of the appended claims or the equivalents thereof.

Furthermore, the series of the steps and processes discussed above as part of the embodiments may be construed as a method for carrying out such steps and processes, as a program for causing a computer to execute such a method, or as a recording medium that stores such a program. The recording medium may be any one of diverse storage media such as CD (Compact Disc), MD (MiniDisc), DVD (Digital Versatile Disk), memory cards, and Blu-ray Disc (registered trademark).

What is claimed is:

1. A processor, comprising:
   circuitry configured to:
   simultaneously fetch a plurality of fixed-length instructions based on a program counter;
   decode a first specific field corresponding to a first set of fixed-length instructions from said plurality of fixed-length instructions and a second specific field corresponding to a second set of fixed-length instructions from said plurality of fixed-length instructions, wherein
      said first specific field and said second specific field are in a plurality of specific bit positions common to said first set of fixed-length instructions and said second set of fixed-length instructions, respectively, and
      said first specific field or said second specific field include a simultaneously issuable instruction count field that indicates a number of simultaneously issuable instructions among said plurality of fixed-length instructions;
   generate a decode result based on said decoded first specific field and said decoded second specific field;
   input, based on said decode result, said first set of fixed-length instructions for sequential processing and said second set of fixed-length instructions for parallel processing; and
   control increment of said program counter based on said decode result, wherein
      said program counter is incremented by first specific field or said second specific field one instruction for said sequential processing, and
      said program counter is incremented based on a value of said simultaneously issuable instruction count field for said parallel processing.

2. The processor according to claim 1, wherein said number of simultaneously issuable instructions is variable.

3. A processor, comprising:
   circuitry configured to:
   simultaneously fetch four fixed-length instructions based on a program counter;
   decode a first specific field corresponding to a first set of fixed-length instructions among said four fixed-length instructions and a second specific field corresponding to a second set of fixed-length instructions among said four fixed-length instructions, wherein
      said first specific field and said second specific field are in a plurality of specific bit positions common to said first set of fixed-length instructions and said second set of fixed-length instructions, respectively, and
      said first specific field or said second specific field include a simultaneously issuable instruction count field that indicates a number of simultaneously issuable instructions among said four fixed-length instructions;
   generate a decode result based on said decoded first specific field and said decoded second specific field;
   input, based on said decode result, said first set of fixed-length instructions for sequential processing and said second set of fixed-length instructions for parallel processing; and control increment of said program counter based on said decode result, wherein
said program counter is incremented by a value corresponding to length of one instruction for Mid sequential processing, and
said program counter is incremented based on a value of said simultaneously issuable instruction count field for said parallel processing.

4. A processor, comprising:
circuitry configured to:
simultaneously fetch a plurality of fixed-length instructions based on a program counter;
execute sequentially specific instructions among said plurality of fixed-length instructions based on a degree of parallelism, wherein
said specific instructions are designated by operation code fields, and
said degree of parallelism is based on information indicated in a first specific field corresponding to a first set of fixed-length instructions from said plurality of fixed-length instructions and a second specific field corresponding to a second set of fixed-length instructions from said plurality of fixed-length instructions;
decode said first specific field and said second specific field, wherein
said first specific field and said second specific field are in a plurality of specific bit positions common to said first set of fixed-length instructions and said second set of fixed-length instructions, respectively, and
said first specific field or said second specific field include a simultaneously issuable instruction count field that indicates a number of simultaneously issuable instructions among said plurality of fixed-length instructions;
generate a decode result based on said decoded first specific field and said decoded second specific field;
input, based on said decode result, said first set of fixed-length instructions for sequential processing and said second set of fixed-length instructions for parallel processing; and
control increment of said program counter based on said decode result, wherein
said program counter is incremented by a value corresponding to length of one instruction for said sequential processing, and
said program counter is incremented based on a value of said simultaneously issuable instruction count field for said parallel processing.

5. A processor, comprising:
circuitry configured to:
simultaneously fetch four fixed-length instructions based on a program counter;
execute sequentially specific instructions based on a degree of parallelism, wherein
said specific instructions are designated by operation code fields, and
said degree of parallelism is based on information indicated in a first specific field corresponding to a first set of fixed-length instructions among said four fixed-length instructions and a second specific field corresponding to a second set of fixed-length instructions among said four fixed-length instructions;
decode said first specific field and said second specific field, wherein said first specific field or said second specific field include a simultaneously issuable instruction count field that indicates a number of simultaneously issuable instructions among said four fixed-length instructions;
generate a decode result based on said decoded first specific field and said decoded second specific field;
input, based on said decode result, said first set of fixed-length instructions for sequential processing and said second set of fixed-length instructions for parallel processing; and
control increment of said program counter based on said decode result, wherein
said program counter is incremented by a value corresponding to length of one instruction for said sequential processing, and
said program counter is incremented based on a value of said simultaneously issuable instruction count field for said parallel processing.

* * * * *